D. T. FISHER.
RAILWAY BRAKE.
APPLICATION FILED DEC. 3, 1908. RENEWED APR. 25, 1914.
1,116,811.                                   Patented Nov. 10, 1914.
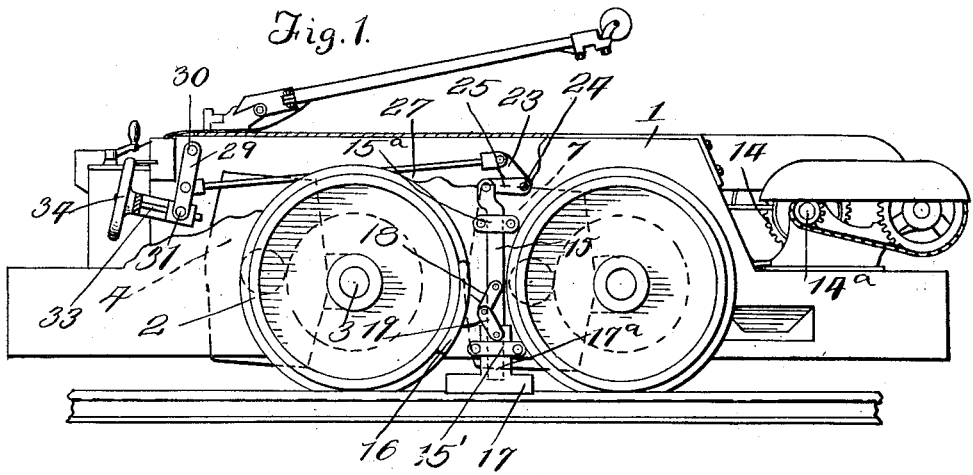
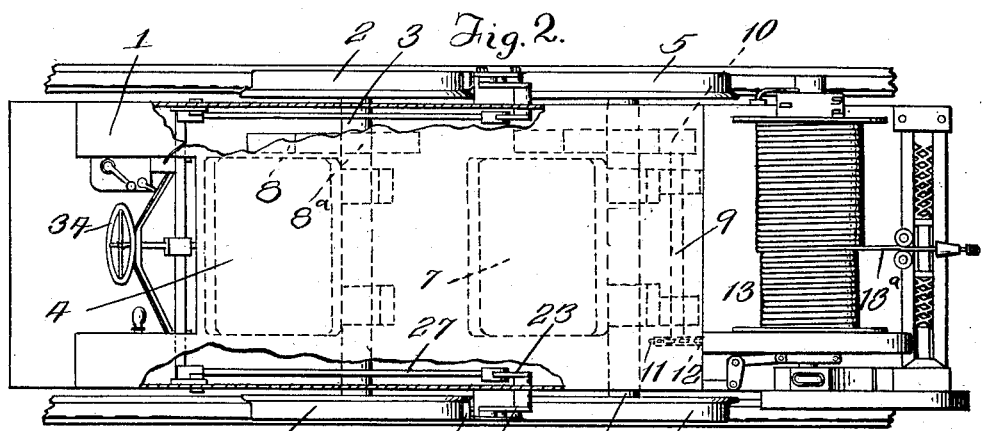
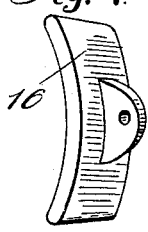
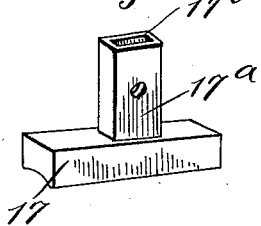
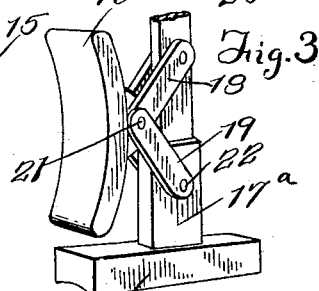
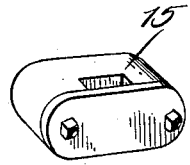
Witnesses
Stuart Hilder.
George R. Bliss.
Inventor
Dudley T. Fisher,
By H. H. Bliss
Attorney
THE NORRIS PETERS CO., PHOTO-LITHO., WASHINGTON, D. C.

UNITED STATES PATENT OFFICE.

DUDLEY TYNG FISHER, OF COLUMBUS, OHIO, ASSIGNOR TO THE JEFFREY MANUFACTURING COMPANY, A CORPORATION OF OHIO.

RAILWAY-BRAKE.

1,116,811.  Specification of Letters Patent.  Patented Nov. 10, 1914.

Original application filed October 8, 1907, Serial No. 396,433. Divided and this application filed December 3, 1908, Serial No. 465,874. Renewed April 25, 1914. Serial No. 834,492.

*To all whom it may concern:*

Be it known that I, DUDLEY T. FISHER, a citizen of the United States, residing at Columbus, in the county of Franklin and State of Ohio, have invented certain new and useful Improvements in Railway-Brakes, of which the following is a specification, reference being had therein to the accompanying drawing.

My invention relates to improvements in railway brakes.

It relates more particularly to railway brakes adapted to be used upon my locomotives which are provided with electric cable reels for the supply of current from a stationary main to the motor or motors on the locomotive, these cables having been brought into use when the vehicle is brought over those sections of track which are remote from the main current supply lines.

The object of the invention is to provide a brake mechanism which will exert a powerful braking action upon the two wheels at opposite ends of one of the axles of a four wheel truck, and which will not interfere with the rotation of the other pair of wheels of the truck. Its object also is to provide a strong simply constructed brake rigging adapted to apply brake pressure to both wheel rim and track.

Figure 1 is a side elevation of the locomotive and brake mechanism constructed in accordance with my invention. Fig. 2 is a top plan view of the same. Fig. 3 is a perspective view of the lower part of the brake mechanism. Figs. 4, 5, 6 and 7 show the wheel brake shoe, the rail brake shoe, brake operating bar and the strap guide respectively.

My brake mechanism is particularly applicable to electric locomotives equipped with reel mechanisms for winding and unwinding conductor cables, and I have shown and will describe such locomotive herein.

In the drawings, a locomotive is shown— (more or less conventionally) having a body or frame structure 1, wheels 2—2 on an axle 3, an electric motor 4, track wheels 5—5 on an axle 6, and a second electric motor 7. Each of the motors 4 and 7 is provided with a driving pinion 8 which meshes with a gear wheel $8^a$ rigidly connected to one of the axles. One of the axle gears $8^a$ engages with a pinion 10 on a supplemental shaft 9.

13 is a rotatable cable reel mounted on the locomotive frame. This reel may be of any usual or preferred form, but in the drawings, for the purpose of illustration, I have shown a reel rotatable about a horizontal axis. Suitable driving connections of any usual or preferred form are interposed between the rotatable shaft 9 and the reel. As shown in the drawings, these driving connections comprise a sprocket wheel 11 on the shaft 9, a sprocket wheel 14 connected with the reel 13, and a chain extending over the two sprocket wheels. $13^a$ indicates an electric conductor cable adapted to be wound upon the reel. The manner of using these reel mechanisms is also well known. Locomotives of the class of that illustrated in the drawings are now commonly used in mines in which there are entries or passage ways, some provided with stationary trolley wires and some without such wires. While the car is running along a section of the track in one of the entries provided with a trolley wire, the electric current is taken from the wire to the motor through an ordinary trolley wheel mounted upon a pole or arm. But when the car is to be moved along the track in one of the entries not provided with a trolley wire, the trolley pole is secured in an inactive position, and then the end of the conductor in the cable $13^a$ is electrically connected to the nearest part of the main trolley wire. After such connection has been made the motorman, by means of his controller, can supply to the motor or motors on the car the current which comes through the cable $13^a$ to the motor circuit. When the motor is returning power is transmitted from the motor 7 through the devices which have been described to cause such a rotation of the reel that it winds up against the cable which during the previous movement of the car was paid along the track.

To prevent difficulties arising from the skidding of the wheels to which the cable reel is connected, I have provided a novel mechanism for braking or stopping the vehicle. I remove all the brake devices from the track wheels 5—5 which latter are indirectly connected with the reel and depend upon the track wheels 2—2 at the other end of the car, and, if necessary, upon the track rail to secure the braking effect. With the wheels 2 are combined shoes 16 which may be of the ordinary character, and these being concavo-convex are adapted to fit the periphery of the rear track wheels 2. Each shoe is operated by a bar 15, preferably arranged to slide in guides such as shown at 15ª. At the lower end of the sliding rod 15 a shoe 17 is shown which is adapted to fit and be pressed against the track rail. This shoe 17 has an upwardly projecting extension 17ª which is fitted in a strap guide 15'.

17ᵇ is a socket into which the lower end of the sliding bar 15 fits.

18—19 are links, the former pivoted at 20 to the sliding bar 15 and the latter pivoted at 22 to the extension 17ª on the shoe. The links are pivoted together at 21, and at this point are also pivoted to the shoe 16. The sliding bar 15, is, at the upper end, suitably connected to the manually-actuated devices for controlling the brake. A bell lever is pivoted at 24, having the arms 23 and 25. 27 is a link connected at 26 with the bell lever and at 28 connected to a lever 29, which is pivoted at 30 to the frame. The lever 29 is moved forward and back by means of a screw rod 33, pivotally connected to the part 31 of the lever 29, and provided with a hand wheel 34.

With the parts above described, it will be seen that the motorman can, at any time, cause a powerful braking action without affecting the front track wheel 5—5. If he desires to stop the car, he, through the hand wheel 34 and the train of devices connected therewith, causes the sliding bar 15 to move downward. The latter exerts a lateral thrust upon the pivot at 21, and a downward thrust upon the pivot at 22 through the links 18 and 19. The former thrust causes the wheel shoe 16 to bear against the track wheel 2 and stop it, or reduce its speed. At the same time, a downward thrust at 22 presses the shoe 17 against the track rail and this acts to still more powerfully and completely stop the car. If this action occur at such a place on the track that the wheel 2 tend to slide after their rotation is stopped, the wheel 5 will nevertheless continue rotating, for nothing has happened to hold them stationary in relation to the car frame, and consequently the reel continues rotating even though the car advances bodily forward after the brakes are applied; and the cable will be picked up from the ground by the reel and wound thereon in a normal manner.

I do not desire to be understood as limiting the application of my invention to cable reeling locomotives, or even to four wheel trucks, of which only one pair of wheels is to be braked. It will be well understood that the lever system shown herein can be duplicated upon the opposite bar 15 to contain a second wheel brake shoe upon the other wheel of the truck upon that side of the car. I therefore desire to have it understood that my invention relates to the system of levers employed and to the relation of rail brake shoe to wheel brake shoe, as well as to the general relation of the braking mechanism to the wheels of the truck.

I do not lay claim herein to the relation of the reel, to the driving wheels and brake mechanism, such having been made the subject-matter of my co-pending application Ser. No. 396,433, for electric locomotives, filed October 8, 1907, of which this present application constitutes a division.

What I claim is:

1. The combination of a truck, an axle therefor, wheels mounted one at each end of the axle, a brake shoe adapted to engage the rim of one of the wheels, a pair of levers pivotally connected to each other and to the brake shoe and forming a toggle joint for forcing the brake shoe into action, a stationary pivotal abutment for one end of the toggle, a vertically movable operating bar connected to the other end of the toggle, and mechanism for moving the said operating bar to force the brake shoe into action.

2. The combination of a truck, an axle therefor, wheels mounted one at each end of the axle, a brake shoe adapted to engage the rim of one of the wheels, a track brake shoe, means for guiding the track brake shoe for vertical movement, a pair of levers pivotally connected to each other and to the wheel brake shoe at their inner ends to form a toggle joint for forcing the said shoe into action, one of the said levers being pivotally connected at its lower end to the track brake shoe, a vertically movable operating bar connected to the upper end of the other lever, and mechanism for moving the said operating bar to force the brake shoes into action.

3. In a brake mechanism, the combination of a pair of toggle levers pivoted to each other, a track brake shoe pivoted to the lower end of one of the levers, a wheel brake shoe pivoted to the inner ends of the said levers, and mechanism for operating the said toggle levers to force the said track shoes into action, the re-active force for each of the said brake shoes being received by the other of the said brake shoes.

4. In a brake rigging, the combination of a wheel brake shoe, a track brake shoe provided with an upward extending arm in the upper end of which is formed a vertical socket, means for guiding said track brake shoe in a vertical path, a vertically operating bar the lower end of which enters the said socket, means for guiding the upper end of the said bar in a vertical path, a pair of toggle levers pivoted to each other and to the said wheel brake shoe at their inner ends, one of said levers being pivoted at its upper end to the operating bar and the other of the said levers being pivoted at its lower end to the said track brake shoe, and mechanism for applying a downward thrust to the operating bar to bring the said shoes into operative positions.

5. The combination of a truck, an axle therefor, wheels mounted one at each end of the axle, a brake shoe adapted to engage the rim of one of the wheels, a track brake shoe, a unitary rigid thrust lever between the two shoes and pivotally connected directly to each, means for guiding the track brake shoe for substantially vertical movement, and a single means for directly applying pressure to the wheel brake shoe and from it through the said thrust lever to the track brake shoe.

6. The combination of a truck, an axle therefor, wheels mounted one at each end of the axle, a brake shoe adapted to engage the rim of one of the wheels, a track brake shoe, a unitary rigid thrust bar between the two shoes and pivotally connected directly to each, means for guiding the track brake shoe for substantially vertical movement, and means for applying pressure obliquely to one of the shoes and from it through the said thrust bar to the other of the shoes.

7. The combination of a truck, an axle therefor, brake wheels one at each end of the axle, a track brake shoe, a vertically movable operating bar above the brake shoe and movable relative thereto, mechanism for actuating the operating bar, a brake shoe adapted to engage the rim of one of the wheels and devices connecting the two brake shoes and the operating bar for transmitting pressure from the bar to the two shoes simultaneously and for transmitting the reaction from each shoe to the other to increase its braking effect.

In testimony whereof I affix my signature, in presence of two witnesses.

DUDLEY TYNG FISHER.

Witnesses:
H. B. ALEXANDER,
JAS. G. CHANDLER.

Copies of this patent may be obtained for five cents each, by addressing the "Commissioner of Patents, Washington, D. C."